United States Patent [19]

Eichhorn et al.

[11] Patent Number: 4,467,232

[45] Date of Patent: Aug. 21, 1984

[54] DIRECT-CURRENT MACHINE

[75] Inventors: Winfried Eichhorn, Tamm; Kurt Eclercy, Landshut, both of Fed. Rep. of Germany

[73] Assignee: International Standard Electrik Corporation, New York, N.Y.

[21] Appl. No.: 492,921

[22] Filed: May 9, 1983

[30] Foreign Application Priority Data

May 14, 1982 [DE] Fed. Rep. of Germany ....... 3218239

[51] Int. Cl.³ ............................................ H02K 21/26
[52] U.S. Cl. .................................... 310/154; 310/254; 310/191
[58] Field of Search ............... 310/154, 191, 181, 254, 310/209

[56] References Cited

U.S. PATENT DOCUMENTS 4,110,649  8/1978  Mas .................................... 310/191

Primary Examiner—Donovan F. Duggan
Attorney, Agent, or Firm—T. E. Kristofferson; A. D. Stolzy

[57] ABSTRACT

A DC machine (motor, etc.) with permanent field magnets arranged in the stator frame and designed as shells. The shell of each pole structure consists of two or more annular segments arranged one behind the other in the axial direction and staggered with respect to one another in the circumferential direction. The staggered arrangement reduces the excitation flux area between the poles and, thus, diminishes the detent torque of the rotor.

5 Claims, 6 Drawing Figures

DIRECT-CURRENT MACHINE

BACKGROUND OF THE INVENTION

1. Field of the Invention

The invention relates generally to direct-current machines having stator permanent magnets.

2. Description of the Prior Art

Direct-current machines of the type to which the invention relates are disclosed, for example, in German patent specification DE-OS 25 58 958. In those prior art machines, V-shaped bevels at the ends of the annular permanent-magnet shells in the stator frame are employed to reduce the excitation flux area toward the pole ends, so that during rotation of the rotor, the magnetic field does not break off abruptly but passes continuously into the neutral zones between the poles.

If the bevels of the annular permanent magnets, arranged one behind the other in the circumferential direction, are of a suitable design, the detent torque and, thus, the variations in permeance are reduced as compared with annular permanent magnets having no such bevels, but the fabrication of such bevels at the ends of the annular permanent magnets and the mounting of such shells in the stator frame are very costly manufacturing steps.

The manner in which the invention provides the desired detent torque reduction in a much less expensive manner will be evident as this description proceeds.

SUMMARY OF THE INVENTION

It may be said that the general object of the invention is to provide a direct-current machine comprising field permanent magnets arranged in the stator frame whereby the detent torque is reduced, and the permanent-magnet shells are easily and inexpensively manufactured.

The invention affords a great advantage in that the detent torque and, thus, variations in permeance are reduced in a simple manner and at low cost.

Further advantageous features will be apparent from the description hereinafter.

The staggered or stepped arrangement of the annular segments of each pole structure will be seen to reduce the excitation flux area between the poles.

BRIEF DESCRIPTION OF THE DRAWINGS

Embodiments of the invention will now be explained with reference to the accompanying drawings.

FIG. 2 is a perspective view of the structure of one of the poles, comprising two staggered annular segments, and of part of the structure of the counterpole, also comprising two staggered annular segments separated from the segments of the other pole structure by a dimension a.

DETAILED DESCRIPTION

Figure 1:
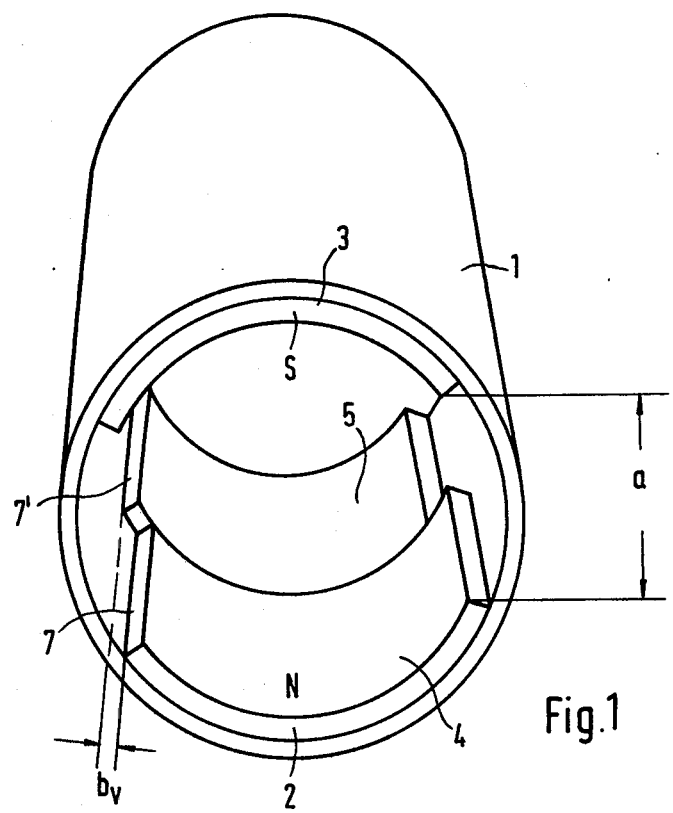
FIG. 1 is a perspective view of the stator frame of a DC machine with annular segments arranged therein.

Referring now to FIG. 1, the stator frame 1 of a direct-current machine will be seen to contain two permanent-magnet shells 2 and 3, which form the north pole and the south pole, respectively. The permanent-magnet shell 2 is divided into annular segments 4 and 5, and the permanent-magnet shell 3 is divided likewise into annular segments 4' and 5' (visible in the representation of FIG. 2), which are arranged one behind the other in the axial direction of the stator frame 1.

The permanent-magnet shells 2 and 3, i.e., the annular segments 4, 5 and 4', 5', may be fixed in the stator frame 1 by known means, for example, through use of a cylindrically bent metal sheet secured in the stator frame 1 with tongues or tabs bent radially from the plane of such sheet.

Within each of the permanent-magnet shells 2 and 3, the end faces 7, 7' and 8, 8' (FIG. 2) of the annular segments 4, 5 and 4', 5' are circumferentially staggered with respect to one another by dimension $b_v$.

Figure 2:
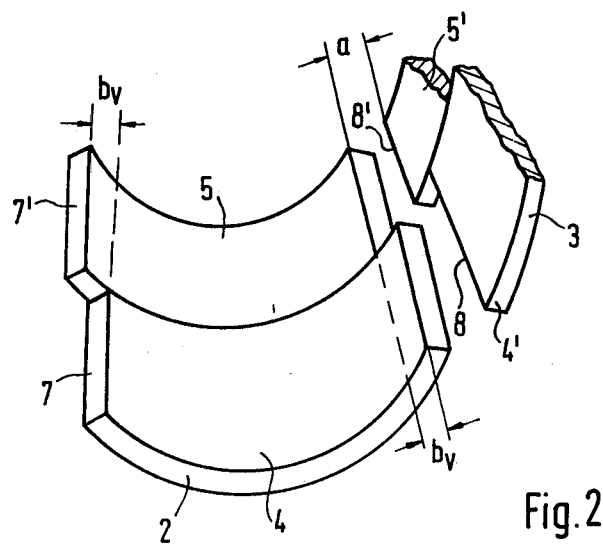

In FIG. 2, the stator frame 1 has been omitted for clarity, and only the annular segments 4 and 5, forming a permanent-magnet shell 2, and part of the annular segments 4' and 5', forming the permanent-magnet shell 3, are shown. All faces, i.e., 7, 7', 7'' and 8, 8' and 8'' are staggered by the dimension $b_v$. The circumferential difference (gap) between the annular segments 4, 5 of the shell 2 and the annular segments 4', 5' of the shell 3 is designated by a. The dimension a between two circumferentially adjacent annular segments, e.g., between 4 and 4' or 5 and 5' or 6 and 6', for example (FIGS. 4 and 5), is always the same and corresponds to the usual distance between two pole structures.

The offset $b_v$ between the annular segments 4, 5 and 4', 5' of each pole structure reduces the excitation flux area, so that during operation of a direct-current machine of the invention, i.e., with a rotor (not shown) inserted in the stator frame 1, the variations in permeance are diminished.

Figure 3:
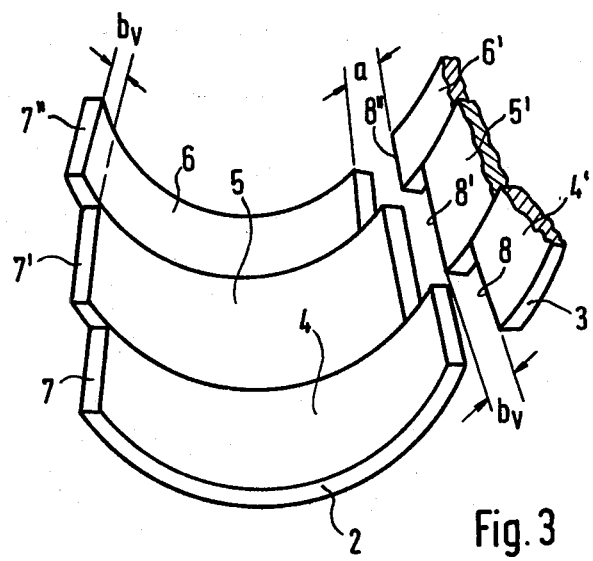
FIG. 3 is a representation similar to that of FIG. 2, showing pole structures consisting of three staggered annular segments.

As shown in FIG. 3, each of the permanent-magnet shells 2 and 3 may also consist of several (three in the example shown) annular segments 4, 5, 6 and 4', 5', 6'. The segments of each pole structure, i.e., the segments 4, 5, 6 and 4', 5', 6', respectively, are staggered with respect to one another by the aforementioned dimension $b_v$. Each of the annular segments 4, 5, 6 of the permanent-magnet shell 2 is separated from the opposite segment 4', 5', and 6' of the permanent-magnet shell 3 by the aforementioned distance a.

Figure 4:
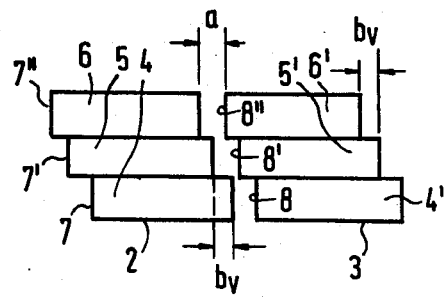
FIGS. 4 and 5 are developed views showing, respectively, the structure of one of the poles and the counterpole, having three annular segments staggered in the circumferential direction.

FIG. 4 shows the arrangement of the annular segments 4, 5, 6 and 4', 5', 6' of the shells 2 and 3 in a developed view. The segments 4, 5, and 6 of the shell 2 are arranged in ascending steps (offset $b_v$), while the opposite segments 4', 5', and 6' of the shell 3, separated from the segments of the shell 2 by the distance a, are arranged in descending steps in the same direction. Conversely staggered arrangements are also possible as an alternative.

Figure 5:
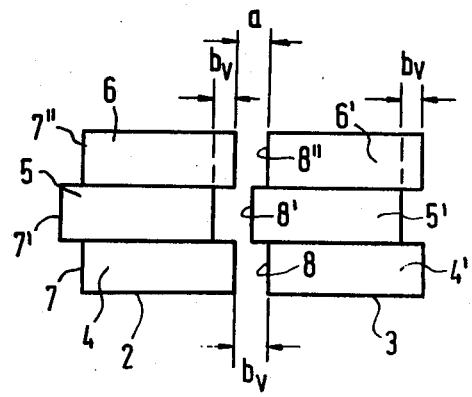

In the developed view of FIG. 5, an alternately stepped arrangement is shown of the annular segments 4, 5, 6 and 4', 5', 6' of the shells 2 and 3, which clearly sets forth the technical advance in this art. The individual annular segments have rectangular outer contours and are correspondingly easy to manufacture. The effect of a bevel within the segments of a pole structure and, hence, a reduction of the excitation flux area toward the segments of the adjacent pole structure can be easily achieved by staggering the individual segments in the stator frame 1 with respect to one another by the measure $b_v$. The shells themselves need not have any actual beveled outer contours, and they are therefore more easily manufactured.

Figure 6:
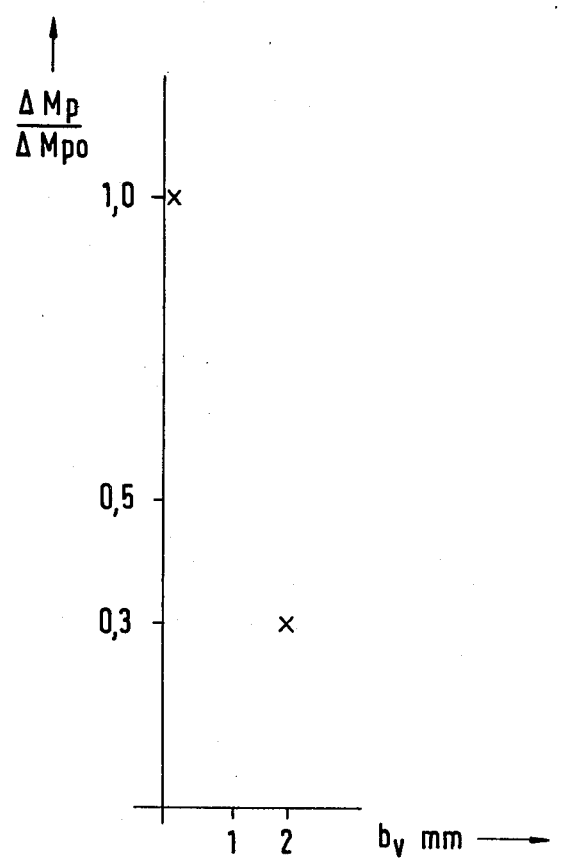
FIG. 6 is a point plot showing the influence of the circumferential offset $b_v$ between two annular segments arranged one behind the other in the axial direction on the detent torque.

The most favorable offset $b_v$ between the individual annular segments of a pole structure can be determined empirically, and the value found for the offset $b_v$ will be incorporated in manufacturing documents. In FIG. 6, the dependence of the ratio of the detent torques, $\Delta Mp/\Delta Mp^o$, on the offset $b_v$ between two annular segments is illustrated with the aid of two points of a measured curve. At an offset of $b_v=0$, the ratio of $\Delta Mp/\Delta Mpo$ is 1.0; at an offset by $b_v=2$ mm, the ratio is 0.3. If the ratio $\Delta Mp/\Delta Mpo$ is fully plotted against $b_v$, a nonlinear curve is obtained, and as $b_v$ increases, the curve does not approach zero but has minima and maxima. For this reason, only two points have been selected from the curve which are obtained at values of $b_v=0$ mm and $b_v=2$ mm.

What is claimed is:

1. A fixed stator structure for a direct-current machine having permanent-magnet field stator elements, comprising:

a generally cylindrical stator frame;

first means comprising a first plurality of equal sized, generally annular, cylindrical permanent-magnet segments arranged to form a first group of permanent-magnet stator members, said first plurality of stator members being arranged in axial juxtaposition and offset circumferentially with respect to each other by an amount small compared to the diameter of said cylindrical stator frame;

second means comprising a second plurality of cylindrical permanent-magnet segments offset and arranged as in said first means, said second means segments being fixed in said stator frame diametrically opposite said first means segments, said offsets of each of said first and second pluralities of segments being arranged to provide a substantially constant circumferential clearance between said segments of said first and second pluralities of segments, the amount of said clearance being greater than the amount of said offset, but small compared to the diameter of said stator frame.

2. Apparatus according to claim 1 further defined in that said plurality of segments of said first and second means is two.

3. Apparatus according to claim 1 further defined in that said plurality of segments is at least three.

4. Apparatus according to claim 3 in which said cylindrical segments of said first and second pluralities are offset in alternate steps, said clearance remaining constant over the axial extent of said segment pluralities.

5. Apparatus according to claim 3 in which said cylindrical segments of said first and second pluralities are offset in progressive steps, said clearance remaining constant over the axial extent of said segment pluralities.

* * * * *